(12) United States Patent
Seo

(10) Patent No.: US 9,223,053 B2
(45) Date of Patent: Dec. 29, 2015

(54) OBJECT DETECTION APPARATUS AND METHOD FOR VEHICLE USING A REFERENCE WAVELENGTH VALUE EXTRACTED FROM A PLURALITY OF CALCULATED CORRECTION WAVELENGTH VALUES AND OUTPUTTING PIXEL DATA HAVING VALUE LARGER THAN THE REFERENCE WAVELENGTH VALUE

(71) Applicant: HYUNDAI MOBIS CO., LTD., Seoul (KR)

(72) Inventor: Sung Jin Seo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 392 days.

(21) Appl. No.: 13/934,901

(22) Filed: Jul. 3, 2013

(65) Prior Publication Data

US 2014/0048688 A1 Feb. 20, 2014

(30) Foreign Application Priority Data

Aug. 16, 2012 (KR) .................. 10-2012-0089498

(51) Int. Cl.
*G01J 3/50* (2006.01)
*G06K 9/00* (2006.01)
*G01V 8/20* (2006.01)

(52) U.S. Cl.
CPC ............. *G01V 8/20* (2013.01); *G06K 9/00362* (2013.01); *G06K 9/00791* (2013.01); *G06K 9/00805* (2013.01); *G06T 2207/20144* (2013.01)

(58) Field of Classification Search
CPC ........ H04N 9/045; G06T 7/00; G06T 11/001; G06T 7/408; G06T 2207/10024; G06T 2207/20144; G06K 9/00805; G06K 9/00798; G06K 9/00362; G06K 9/00624; G06K 2009/00644; G06K 9/00664; G06K 9/2018; G06K 9/00791; G08G 1/166; G01J 3/457
USPC .............. 250/226, 221, 208.1; 348/234, 272, 348/294; 382/162, 163, 164, 165, 167; 356/425
See application file for complete search history.

(56) References Cited

U.S. PATENT DOCUMENTS

| 4,488,245 | A | * | 12/1984 | Dalke | ...................... G01J 3/46 356/405 |
| 7,433,496 | B2 | | 10/2008 | Ishii et al. | |
| 2009/0169103 | A1 | * | 7/2009 | Chang | ..................... H04N 9/646 382/167 |
| 2010/0103278 | A1 | * | 4/2010 | Suzuki | .................. H04N 1/6052 348/222.1 |
| 2012/0123637 | A1 | * | 5/2012 | Funayama | ................ G01J 3/02 701/36 |
| 2013/0027702 | A1 | * | 1/2013 | Kawamata | .............. G01J 3/457 356/326 |

FOREIGN PATENT DOCUMENTS

| JP | 2002-362302 A | 12/2002 |
| JP | 2010-161736 A | 7/2010 |
| KR | 10-2009-0102259 A | 9/2009 |
| KR | 10-2010-0056143 A | 5/2010 |
| KR | 10-2011-0026566 | 3/2011 |

* cited by examiner

*Primary Examiner* — Que T Le
*Assistant Examiner* — Jennifer Bennett
(74) *Attorney, Agent, or Firm* — NSIP Law

(57) ABSTRACT

Provided is an object detection apparatus using a general camera sensor for adjusting detection sensitivity to an object (pedestrian or animal) even in an urban area in which the scattered reflection of a light source is severe. The object detection apparatus overcomes the limitations of a related art object detection apparatus using a thermal imaging camera which is incapable of adjusting detection sensitivity to an obstacle (pedestrian or animal) in an urban area in which the scattered reflection of a light source is severe.

11 Claims, 3 Drawing Sheets

OBJECT DETECTION APPARATUS AND METHOD FOR VEHICLE USING A REFERENCE WAVELENGTH VALUE EXTRACTED FROM A PLURALITY OF CALCULATED CORRECTION WAVELENGTH VALUES AND OUTPUTTING PIXEL DATA HAVING VALUE LARGER THAN THE REFERENCE WAVELENGTH VALUE

CROSS-REFERENCE TO RELATED APPLICATIONS

This application claims priority under 35 U.S.C. §119 to Korean Patent Application No. 10-2012-0089498, filed on Aug. 16, 2012, the disclosure of which is incorporated herein by reference in its entirety.

TECHNICAL FIELD

The present disclosure relates to an object detection apparatus and method for vehicles, and in particular, to an object detection apparatus using a general camera sensor and a detection method thereof for adjusting detection sensitivity to an object (pedestrian or animal) even in an urban area in which the scattered reflection of a light source is severe.

BACKGROUND

Generally, thermal imaging cameras using far-infrared (FIR) light do not sense a visible light area but sense a far-infrared area. That is, the thermal imaging cameras senses infrared thermal energy that is produced by a subject, and obtains the sensed result as a thermal image. Due to this characteristic, the thermal imaging cameras may be used to sense a person having a body temperature.

Recently, a pedestrian detection apparatus using an FIR camera is applied to vehicles. The FIR camera applied to a vehicle needs to provide consistent detection performance irrespective of a current driving environment of the vehicle. That is, the FIR camera applied to a vehicle needs to provide consistent detection performance even in an urban area in which scattered reflection due to ambient light sources is severe or an out-of-town area in which scattered reflection due to ambient light sources is not severe.

Therefore, a function of adjusting detection sensitivity is fundamentally added to a related art FIR camera applied to a vehicle, for providing consistent detection performance. The sensitivity adjustment function adjusts the setting of a radiant temperature difference between objects for a captured thermal image, thereby adjusting detection sensitivity.

However, there is a limitation in adjusting detection sensitivity in an urban area in which the scattered reflection of light emitted from an ambient building, the scattered reflection of light emitted from a signboard attached to an ambient building, and particularly, the scattered reflection of light of front and rear vehicles are severe. Furthermore, FIR cameras are expensive equipment, but, as described above, the FIR cameras cannot satisfy detection performance for price which a user desires, in an urban area in which scattered reflection is severe.

Moreover, it is possible to detect a pedestrian using a complementary metal-oxide-silicon (CMOS) camera relatively cheaper than FIR cameras. However, CMOS cameras do not obtain an image of a subject but sense infrared thermal energy produced by the subject, and thus do not have a sensitivity adjustment function using the radiant temperature difference of a subject. That is, in an urban area in which scattered reflection is severe, it is especially unable to detect a night pedestrian, and, as in FIR cameras, it is difficult to clearly determine if an object is a pedestrian or an animal.

SUMMARY

Accordingly, the present disclosure provides an object detection apparatus for accurately detecting a subject even in an urban area in which scattered reflection is severe due to a number of light sources.

The present disclosure also provides an object detection method using the object detection apparatus.

In one general aspect, an object detection apparatus, which outputs an output image with no light image which is added into a background other than an object when extracting the object from an image including the object, includes: a sensor sensing light having a specific wavelength band to output a plurality of raw data corresponding to the sensed light; a pixel data extractor extracting a plurality of pixel data from the plurality of raw data, wherein the pixel data extractor analyzes transmissivities by wavelength band of each of the raw data, and extracts the plurality of pixel data, composed of R, G, and B values, from the respective raw data with the analyzed transmissivities; a reference wavelength value extractor performing an arithmetic operation on the R, G, and B values to calculate correction wavelength values by pixel data, comparing the calculated correction wavelength values, and extracting one of the correction wavelength values as a reference wavelength value according to the analyzed result; and a data selector receiving the plurality of pixel data, selectively outputting pixel data having a wavelength value greater than the reference wavelength value among the plurality of pixel data, and adjusting detection sensitivity of the sensor.

In another general aspect, an object detection method includes: sensing, by a sensor, light having a specific wavelength band to output a plurality of raw data corresponding to the sensed light; extracting a plurality of pixel data from the plurality of raw data, wherein transmissivities by wavelength band of each of the raw data is analyzed, and the plurality of pixel data composed of R, G, and B values are extracted from the respective raw data with the analyzed transmissivities; performing an arithmetic operation on the R, G, and B values to calculate correction wavelength values by pixel data; comparing the calculated correction wavelength values, and extracting one of the correction wavelength values as a reference wavelength value according to the analyzed result; and selecting pixel data, having a wavelength value greater than the reference wavelength value, from among the plurality of pixel data to adjust detection sensitivity of the sensor on the basis of the reference wavelength value.

Other features and aspects will be apparent from the following detailed description, the drawings, and the claims.

DETAILED DESCRIPTION OF EMBODIMENTS

Figure 1:
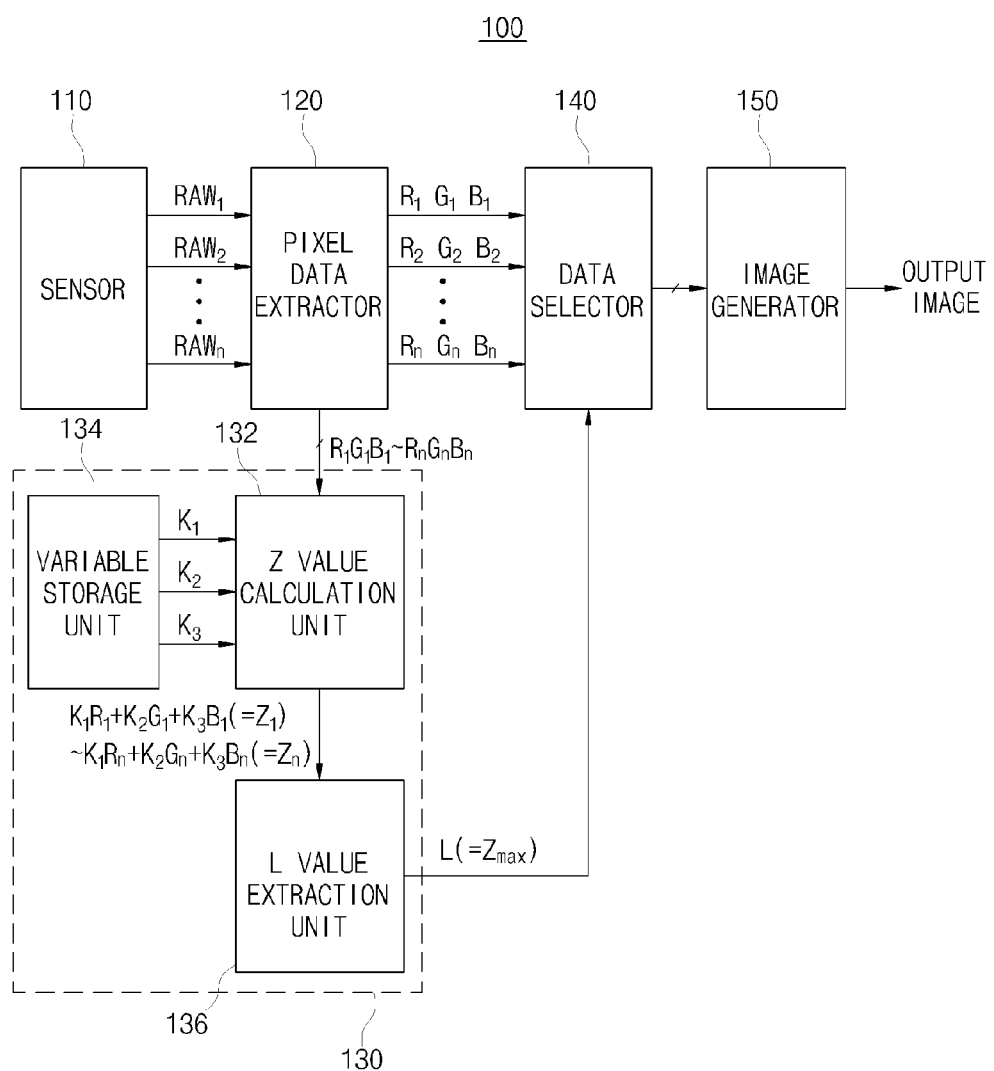
FIG. 1 is a block diagram illustrating main elements of an object detection apparatus according to an embodiment of the present invention.

Exemplary embodiments of the present invention capable of being easily embodied by those skilled in the art will now be described in detail with reference to the accompanying drawings. The present invention may, however, be embodied in many different forms and should not be construed as being limited to the embodiments set forth herein. In the accompanying drawings, a portion irrelevant to a description of the present invention will be omitted for clarity. Like reference numerals refer to like elements throughout.

In this disclosure below, when it is described that one comprises (or includes or has) some elements, it should be understood that it may comprise (or include or has) only those elements, or it may comprise (or include or have) other elements as well as those elements if there is no specific limitation. Moreover, each of terms such as "... unit", "... part" and "apparatus" described in specification denotes an element for performing at least one function or operation, and may be implemented in hardware, software or the combination of hardware and software.

FIG. 1 is a block diagram illustrating main elements of an object detection apparatus according to an embodiment of the present invention.

Referring to FIG. 1, an object detection apparatus 100 according to an embodiment of the present invention adjusts detection sensitivity to an object (pedestrian or animal) even in an environment such as an urban area in which a plurality of light sources are disposed near the object to be detected, the object detection apparatus 110 outputs an output image with no light image which is added into a background other than an object when extracting the object from an image including the object.

To this end, the object detection apparatus 100 includes a sensor 110, a pixel data extractor 120, a reference wavelength value extractor 130, a data selector 140, and an image generator 150.

The sensor 110 is an image sensor that senses object (or subject) information and converts the sensed information into an electrical image signal. The sensor 110 senses light having a specific wavelength band of 300 nm to 1500 nm, and generates a plurality of raw data corresponding to the sensed light. Above all, instead of the existing high-cost thermal imaging camera, a low-cost general camera sensor that senses light having the specific wavelength band may be used. For example, a charge-coupled device (CCD) image sensor or a CMOS image sensor may be used. The CMOS image sensor is configured with a plurality of light receiving elements that collect light incident through a lens. Each of the light receiving elements is classified as a cell, and light incident on each cell is converted into an electrical signal. The converted electrical signal is finally converted into unprocessed raw data and outputted, for extracting red (R), green (G), and blue (B) color components. Here, one piece of raw data is generated in units of one cell, and, when the light receiving elements is respectively classified as n number of cells, n pieces of raw data RAW1 to RAWn (where n is a natural number more than one) are generated.

The pixel data extractor 120 receives n pieces of raw data RAW1 to RAWn from the sensor 110, and extracts n pieces of pixel data R1G1B1 to RnGnBn respectively corresponding to the n pieces of raw data RAW1 to RAWn. The pixel data extractor 120 analyzes transmissivity of each of the raw data RAW1 to RAWn in a wavelength band of 300 nm to 1500 nm, calculates quantum efficiency (QE) with the analyzed transmissivity, and extracts pixel data (including a R component value, a G component value, and a B component value) from each of the raw data RAW1 to RAWn on the basis of the calculated QE.

The reference wavelength value extractor 130 calculates the R, G, and B component values by performing an arithmetic operation, and calculates a plurality of correction wavelength values Z that have been corrected for each of the pixel data R1G1B1 to RnGnBn. Here, each of the correction wavelength values Z is defined as indicating a wavelength band in which sensitivity of each of R, G, and B component values in a corresponding pixel is highest. The corrected wavelength value is obtained through an arithmetic operation expressed as the following Equation (1) which has been obtained through several experiments performed by the applicant. The reference wavelength value extractor 130 extracts the greatest value of the calculated correction wavelength values Z (Zi, 1≤i≤n) as a reference wavelength value L.

$$Zi = k1Ri + k2Gi + k3Bi \qquad (1)$$

where Zi denotes an ith correction wavelength value, Ri is an ith R component value, Gi is an ith G component value, Bi is an ith B component value, i has a range of 1≤i≤n, k1 is defined to be 0.257, k2 is defined to be 0.573, and k3 is defined to be 0.127.

To perform the arithmetic operation expressed as Equation (1), the reference wavelength value extractor 130 includes a correction wavelength value calculation unit 132, a variable storage unit 134, and a maximum wavelength value extraction unit 136.

The correction wavelength value calculation unit 132 executes an algorithm expressed as Equation (1). The correction wavelength value calculation unit 132 receives the pixel data R1G1B1 to RnGnBn from the pixel data extractor 120 and first to third variables k1 to k3 from the variable storage unit 134, and, by respectively multiplying R, G, and B component values (composing each pixel data) by the first to third variables, the correction wavelength value calculation unit 132 calculates the correction wavelength values "Z1(=k1R1+k2G1+k3B1)–Zn(=k1Rn +k2Gn+k3Bn)". The variable storage unit 134 may be a kind of nonvolatile memory that transfers the stored first to third variables k1 to k3 to the correction wavelength value calculation unit 132 in response to the request of the correction wavelength value calculation unit 132. The maximum wavelength value extraction unit 136 collects the correction wavelength values "Z1(=k1R1+k2G1+k3B1)–Zn(=k1Rn+k2Gn+k3Bn)" calculated by the correction wavelength value calculation unit 132, extracts the greatest value of the collected correction wavelength values as a correction wavelength value Zamax, and outputs the extracted correction wavelength value "L=Zamax" as the reference wavelength value "L=Zamax". The output reference wavelength value L is transferred to the data selector 140.

The data selector 140 receives the reference wavelength value L from the maximum wavelength value extraction unit 136 of the reference wavelength value extractor 130, and receives the pixel data R1G1B1 to RnGnBn from the pixel data extractor 120. The data selector 140 selectively outputs a plurality of pixel data, having a wavelength band greater than the reference wavelength value L, to the image data generator 150, and blocks the output of pixel data (having a wavelength band less than or equal to the reference wavelength value L) to the image data generator 150.

The image generator 150 generates and outputs a final output image composed of a plurality of pixel data having a wavelength band greater than the reference wavelength value L selected by the data selector 140.

As described above, in commonly sensing the heat of an object and adjusting detection sensitivity to the object (pedestrian or animal), the object detection apparatus 100 of the present invention overcomes a limitation in which it is unable to adjust detection sensitivity for detecting the object in an environment in which there are a number of heating devices (for example, front driving vehicles, rear driving vehicles, ambient light, etc.) as in an urban area, and can detect the object by using a general low-cost camera sensor such as a CMOS image sensor without using a high-cost thermal imaging camera.

Figure 2:
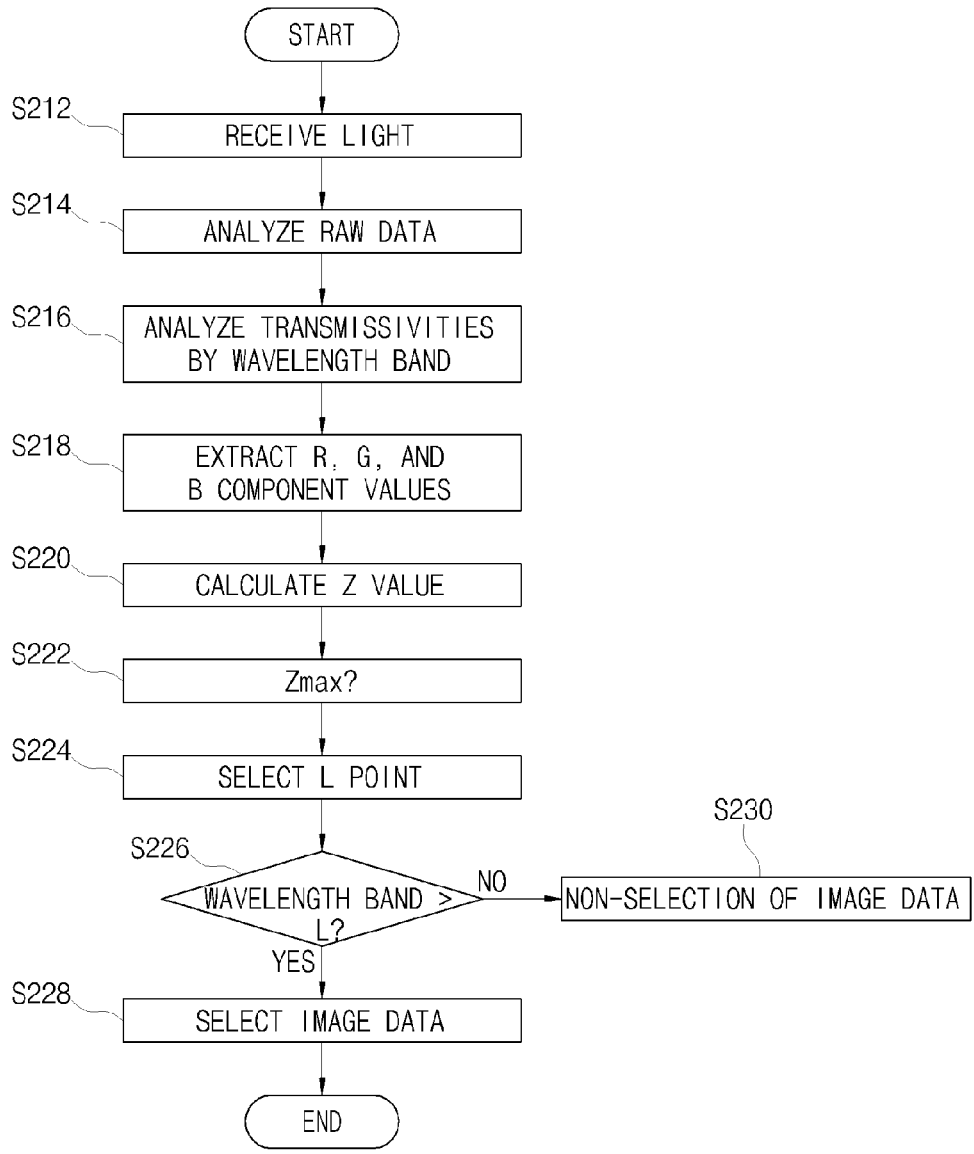
FIG. 2 is a flowchart illustrating an object detection method according to an embodiment of the present invention.

FIG. 2 is a flowchart illustrating an object detection method using the object detection apparatus of FIG. 1.

Referring to FIG. 2, the object detection apparatus collects light having a range of 300 nm to 1500 nm with a general camera sensor such as a CMOS image sensor or a CCD image sensor, in operation S212.

Subsequently, the object detection apparatus converts the collected light into raw data in operation S214, and analyzes transmissivities by wavelength of the converted raw data in operation S216.

Subsequently, the object detection apparatus calculates QE with the analyzed transmissivities by wavelength, and extracts a plurality of pixel data composed of R, G, and B component values on the basis of the calculated QE, in operation S218.

Subsequently, the object detection apparatus substitutes the R, G, and B component values, extracted in operation S218, into Equation (1) to calculate the correction wavelength values Z1 to Zn by data of each pixel, in operation S220. Subsequently, the object detection apparatus extracts the correction wavelength value Zmax corresponding to the greatest value of the calculated correction wavelength values Z1 to Zn, in operation S222.

Subsequently, the object detection apparatus sets the correction wavelength value Zmax, extracted in operation S222, as the reference wavelength value L in operation S224, and compares the reference wavelength value L with a wavelength band of pixel data in operation S226.

Subsequently, pixel data having a wavelength band greater than the reference wavelength value L is set as final image data composing an output image, in operation S228. Also, pixel data having a wavelength band less than or equal to the reference wavelength value L is not used as the final image data composing the output image, and is dropped, in operation S230.

Figure 3:
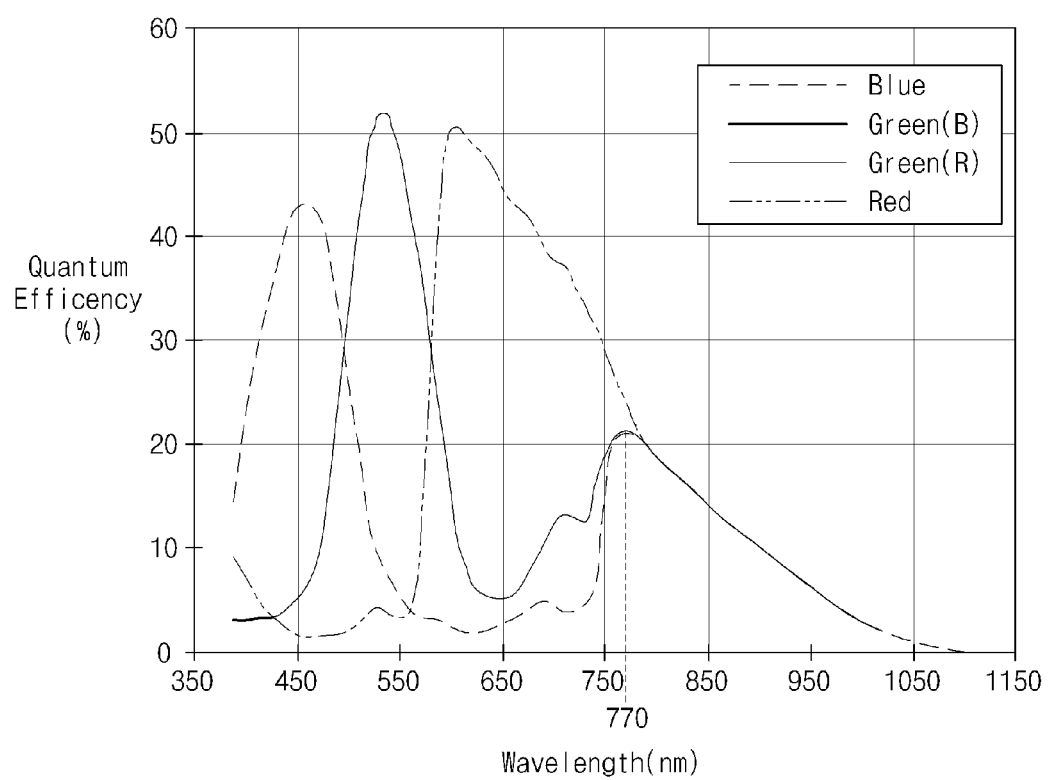
FIG. 3 is a graph for schematically describing an operation of setting a reference wavelength value "L" in operation S224 of FIG. 2.

FIG. 3 is a graph for schematically describing an operation of setting a reference wavelength value "L" in operation S224 of FIG. 2. In FIG. 3, the abscissa axis indicates a wavelength, and the ordinate axis indicates the QEs of R, G, and B component values.

As shown in FIG. 3, in a general camera sensor in which the input characteristic (QE) of an image is analyzed, a point in which the QEs of R, G, and B component values are evenly high becomes the reference wavelength value L of the present invention. In the shown graph, the highest QE value (÷21.912) is formed at a point of 770 nm. Accordingly, the reference wavelength value L is set to 770 nm.

According to the present invention, provided is the object detection apparatus using a general camera sensor which can adjust detection sensitivity to an object (pedestrian or animal) even in an environment in which the scattered reflection due to a number of light sources is severe, thus overcoming the limitations of a related art object detection apparatus using a thermal imaging camera which is incapable of adjusting detection sensitivity to an obstacle (pedestrian or animal) in an urban area in which the scattered reflection of a light source is severe.

Moreover, by designing the object detection apparatus using a low-cost general camera, the manufacturing cost can be considerably reduced.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An object detection apparatus, which outputs an output image with no light image which is added into a background other than an object when extracting the object from an image including the object, comprising:
    a sensor sensing light having a specific wavelength band to output a plurality of raw data corresponding to the sensed light;
    a pixel data extractor extracting a plurality of pixel data from the plurality of raw data, wherein the pixel data extractor analyzes transmissivities by wavelength band of each of the raw data, and extracts the plurality of pixel data, composed of R, G, and B values, from the respective raw data with the analyzed transmissivities;
    a reference wavelength value extractor performing an arithmetic operation on the R, G, and B values to calculate correction wavelength values by pixel data, comparing the calculated correction wavelength values, and extracting one of the correction wavelength values as a reference wavelength value according to the analyzed result; and
    a data selector receiving the plurality of pixel data, selectively outputting pixel data having a wavelength value greater than the reference wavelength value among the plurality of pixel data, and adjusting detection sensitivity of the sensor.

2. The object detection apparatus of claim 1, wherein the sensor senses the specific wavelength band of 300 nm to 1500 nm.

3. The object detection apparatus of claim 1, wherein the sensor is a CMOS image sensor.

4. The object detection apparatus of claim 1, wherein the reference wavelength value extractor comprises:
    a correction wavelength value calculation unit respectively multiplying the R, G, and B values by first to third variables to calculate the correction wavelength values by raw data, the R, G, and B values being extracted from the respective raw data; and
    a maximum wavelength value extraction unit extracting a greatest value of the correction wavelength values as the reference wavelength value.

5. The object detection apparatus of claim 4, wherein the reference wavelength value extractor further comprises a variable storage unit storing the first to third variables.

6. The object detection apparatus of claim 5, wherein,
    the first variable is 0.257,
    the second variable is 0.573, and
    the third variable is 0.127.

7. An object detection method, comprising:
    sensing, by a sensor, light having a specific wavelength band to output a plurality of raw data corresponding to the sensed light;
    extracting a plurality of pixel data from the plurality of raw data, wherein transmissivities by wavelength band of each of the raw data is analyzed, and the plurality of pixel data composed of R, G, and B values are extracted from the respective raw data with the analyzed transmissivities;

performing an arithmetic operation on the R, G, and B values to calculate correction wavelength values by pixel data;

comparing the calculated correction wavelength values, and extracting one of the correction wavelength values as a reference wavelength value according to the analyzed result; and selecting pixel data, having a wavelength value greater than the reference wavelength value, from among the plurality of pixel data to adjust detection sensitivity of the sensor on the basis of the reference wavelength value.

8. The object detection method of claim 7, wherein the performing the arithmetic operation comprises respectively multiplying the R, G, and B values by first to third variables to calculate the correction wavelength values by raw data, the R, G, and B values being extracted from the respective raw data.

9. The object detection method of claim 8, wherein,
the first variable is 0.257,
the second variable is 0.573, and
the third variable is 0.127.

10. The object detection method of claim 7, wherein the extracting one of the correction wavelength values comprises extracting a greatest value of the correction wavelength values as the reference wavelength value.

11. The object detection method of claim 7, wherein the sensing light comprises sensing, by the sensor, the specific wavelength band of 300 nm to 1500 nm.

* * * * *